United States Patent
Oroskar et al.

(10) Patent No.: US 7,885,239 B1
(45) Date of Patent: Feb. 8, 2011

(54) MULTI-SECTOR RATE CONTROL

(75) Inventors: Siddarth S. Oroskar, Overland Park, KS (US); Sachin R. Vargantwar, Overland Park, KS (US); Manoj Shetty, Overland Park, KS (US); Ashvini Ganesh G. Canjeevaram, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 767 days.

(21) Appl. No.: 11/761,613

(22) Filed: Jun. 12, 2007

(51) Int. Cl.
*H04J 3/00* (2006.01)

(52) U.S. Cl. ............ 370/336; 370/326; 370/345; 370/337; 370/347; 455/445; 455/450; 455/451; 455/452.1

(58) Field of Classification Search .......... 370/336, 370/337, 347, 498, 442, 468, 326, 345; 455/442–453, 455/532.1, 434, 435.2, 436, 438, 439
See application file for complete search history.

(56) References Cited

U.S. PATENT DOCUMENTS 6,757,520 B2 * 6/2004 Attar et al. ............ 455/63.1

| | | | |
|---|---|---|---|
| 2003/0017831 A1 * | 1/2003 | Lee et al. | 455/453 |
| 2004/0002341 A1 * | 1/2004 | Chen | 455/453 |
| 2007/0042781 A1 * | 2/2007 | Yavuz et al. | 455/445 |

\* cited by examiner

*Primary Examiner*—Kent Chang
*Assistant Examiner*—San Htun (57) ABSTRACT

An improved mechanism for managing allocation of air interface timeslots for transmission of data to access terminals. When an access terminal requests an access network to transmit data to the access terminal in a first sector, the access terminal will identify within its request a second sector that the access network can optionally use instead. The access network will then determine whether a threshold number of upcoming timeslots in the first sector are already scheduled to carry data to other access terminals and whether at least one of those timeslots is available for use in the second sector. If so, the access network will then responsively transmit the data to the access terminal in the at least one timeslot on the second sector. Advantageously, this process can help to increase sector throughput.

11 Claims, 5 Drawing Sheets

MULTI-SECTOR RATE CONTROL

FIELD OF THE INVENTION

The present invention relates to wireless communications and, more particularly, to management of data communication between a radio access network and a radio access terminal. The invention can be advantageously applied in the context of high data rate wireless communications pursuant to EIA/TIA IS-856 (e.g., 1xEV-DO) Rel. 0 or Rel. A, for instance, but the invention may have broader applicability as well.

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennae in the cells are in turn coupled to a radio node controller (RNC) or a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

Most cells in a wireless network are usually further divided geographically into a number of sectors, each defined respectively by radiation patterns from directional antenna components of the respective BTS, or by respective BTS antennae. These sectors (which can be visualized ideally as pie pieces) can be referred to as "physical sectors," "cell sectors," or just "sectors," since they correspond to physical areas of a cell site. At any given instant, an access terminal (such as a cellular telephone, pager, or appropriately equipped portable computer, for instance) in a wireless network will typically be positioned in a given physical sector and will be able to communicate with the transport network via the BTS serving that physical sector.

According to the wireless cellular protocol IS-856, an access terminal regularly monitors the signal strength of pilot signals that the access terminal receives from the sectors in its vicinity. Signal strength is typically measured as a carrier-to-interference (C/I) ratio, or a signal-to-interference-plus-noise ratio (SINR), for example. The access terminal then selects as a serving sector the sector whose pilot signal has the highest signal strength, and the access terminal uses that signal strength as a basis to select a data rate at which to request the sector to transmit data to the access terminal. In particular, IS-856 defines a fixed mapping between SINR (or C/I) and "Data Rate Control" (DRC) codes, with each DRC code corresponding to a given range of SINR (or C/I) values and defining a particular data rate. Applying that mapping, the access terminal selects a DRC code and sends a DRC request over an air interface control channel to the access network, identifying (i) the DRC code and (ii) the selected sector, by a "DRC_cover" value.

IS-856 operates in a time division multiplex (TDM) manner by dividing air interface communications in each sector into timeslots, and with timeslots synchronized on all sectors in an access network's coverage area. Advantageously, bearer data communications in each timeslot can then be transmitted from the access network to the access terminal at the full sector power without interfering with transmissions to other access terminals in that sector. Consequently, the chance of successful data transmission to the access terminal is greatly increased, and the overall throughput of the sector tends to increase.

Each DRC code that an access terminal sends to the access network defines a requested data rate by corresponding with a modulation scheme and a maximum number of interlaced timeslots that the access network will use when it attempts to transmit a radio link layer data packet to the access terminal. In particular, the higher the DRC, the fewer the timeslots, and thus in theory the quicker the data transmission will occur to the access terminal. This correspondence logically follows from the fact that a higher DRC corresponds with a higher SINR (or C/I), which means that air interface conditions are better and should therefore be able to support a higher data-rate modulation scheme, and thus quicker successful transmission to the access terminal.

For a given DRC corresponding with a particular number of timeslots, the access network repeatedly attempts transmission of the packet to the access terminal in sequential (interlaced) timeslots, adding more error correction coding in each successive timeslot and/or transmitting various portions of the packet with various error correction coding in each successive timeslot, with the goal that the access terminal will ultimately receive enough data to constitute or facilitate uncovering of the packet as a whole. For instance, if the packet payload comprises the elements ABCD, the access network may transmit in the first timeslot the full payload ABCD plus some error correction coding. If that transmission is insufficient, the access network may then transmit in the next timeslot a portion of the payload, such as ABC, plus some additional error correction coding. And if that transmission is still insufficient, the access network may then transmit in the next timeslot another portion of the payload, such as BDC, plus more substantial error correction coding. This process would continue until the packet transmission is successful or until the number of timeslots is exhausted (in which case the transmission would have failed).

During this packet transmission process, for each timeslot that does not result in the access terminal having successfully received or uncovered the complete packet payload, the access terminal transmits a negative acknowledgement (NACK) to the access network, to prompt the access network to keep trying if additional timeslots remain. On the other hand, once the access terminal has received the complete packet, the access terminal transmits a positive acknowledgement (ACK) to the access network, which tells the access network that transmission of the packet was successful. If successful receipt of a given packet occurs before the allocated number of timeslots have passed, the access network then proceeds to the next packet, saving timeslot resources by not having to re-transmit the given packet or a portion of the given packet again.

According to IS-856, if an access terminal has been receiving transmissions on a given sector and discovers that another sector is exhibiting a stronger signal-to-noise ratio (i.e., SINR or C/I), the access terminal will ask the access network to begin serving the access terminal on the new sector instead. In particular, once the access terminal finishes receiving any packet currently being transmitted on the current sector, the access terminal would begin the handoff process by sending a series of null DRC messages on its current sector, to notify the access network that the access terminal is about to hand off to another sector, so that the access network will hold any packets destined for the access terminal until the handoff is complete. The access terminal would then begin sending DRCs on the new sector, to cause the access network to begin transmitting packets to the access terminal on the new sector.

SUMMARY

The present invention provides an improved mechanism for managing allocation of air interface timeslots for transmission of data to access terminals. According to the invention, when an access terminal requests the access network to transmit data to the access terminal in a first sector, the access terminal will identify within its request a second sector that the access network can optionally use instead. The access network will then determine whether a threshold number of upcoming timeslots in the first sector are already scheduled to be occupied with data destined to other access terminals and whether at least one of those timeslots is available for use in the second sector. If so, the access network will then responsively transmit the data (i.e., schedule transmission of the data) to the access terminal in the at least one timeslot in the second sector. Advantageously, this process will increase sector throughput, as the process will allow at least some data to be sent to the access terminal in an upcoming timeslot, even if at a slightly slower rate.

If the invention is applied in IS-856, the access terminal will conventionally monitor the respective signal strengths of the various sectors in its vicinity and will select the sector with the highest signal strength to be its primary serving sector. The signal strength of a sector is typically measured by the access terminal as a carrier-to-interference (C/I) ratio, or a signal-to-interference-plus-noise ratio (SINR). While not necessarily identical in all contexts, both C/I and SINR are generally used interchangeably herein as an indicator of sector signal strength. As noted above, the access terminal will normally send a DRC message to the access network, identifying the selected sector with a DRC_cover parameter, and specifying a DRC code determined based on the measured C/I ratio (or SINR) of that sector.

Applying the invention in this context, the access terminal may additionally select a second-best sector, such as the sector that has the second highest C/I ratio, and the access terminal may include within its DRC request an indication of that second-best sector and a corresponding data rate. For instance, the access terminal may include within its DRC request, in addition to the conventional DRC_cover and DRC code, (i) a secondary DRC_cover identifying the second-best sector and (ii) a secondary DRC code indicating a data rate corresponding with the C/I ratio that the access terminal measured for the second-best sector. A DRC request carrying these additional, secondary values may be referred to as an "expanded DRC request."

Upon receipt of an expanded DRC request, if the access network has data to send to the access terminal, the access network will determine whether at least a threshold number of upcoming timeslots in the primary serving sector are currently scheduled for use to send data to other access terminals. For instance, the threshold number may be the next two timeslots, in which case the access network would determine whether the next two timeslots in the primary sector are currently scheduled for use to transmit data to other access terminals. If so, the access network may then determine whether any one of those upcoming timeslots is available in the secondary sector and, if so, the access network will transmit data to the access terminal in the first such upcoming timeslot in the secondary sector. Otherwise, the access network may conventionally transmit the data to the access network in the primary sector.

To facilitate operation of the invention in practice, when an access terminal sends an expanded data transmission request (e.g., an expanded DRC request) to an access network, the access terminal will tune to each of the sectors identified in the request, so that the access terminal can receive incoming communications in any of those sectors. The access terminal may be structured to do this with rake receivers, with multiple transceivers, or in some other manner, depending on factors such as how the sectors are distinguished from each other.

Further, in a preferred embodiment, the invention will be carried out at a radio network controller (RNC) that controls one or more base transceiver stations (BTSs) each defining multiple sectors. Note that an RNC is considered to be the "serving RNC" of any access terminal operating in one or more sectors under the RNC's control. With IS-856, an access terminal would generate and send an expanded DRC request to its serving RNC by transmitting the expanded DRC request over the air in the access terminal's primary serving sector (the sector having the highest detected C/I ratio). For instance, the access terminal may send the expanded DRC request encoded with a PN offset of the primary serving sector, to facilitate access network receipt of the expanded DRC request on the primary serving sector. The receiving BTS would then pass the expanded DRC request along to the serving RNC.

Upon receipt of the expanded DRC request, the serving RNC would then read the request to determine (i) the primary requested sector and corresponding primary requested data rate and (ii) the secondary requested sector and corresponding secondary requested data rate. The RNC would then determine whether at least a threshold number of upcoming timeslots in the primary sector are currently scheduled for use to transmit data to one or more other access terminals and whether at least one of those timeslots is available in the second sector. If so, the serving RNC would transmit data to the access terminal in the at least one timeslot in the secondary sector. Otherwise, the serving RNC would transmit data to the access terminal in a conventional manner in the primary sector.

In the preferred embodiment, the access network will transmit data on the secondary sector instead of the primary sector only if air interface conditions in the secondary sector are not too much worse compared with the primary sector. That way, performance would not be degraded by slowing down transmission too much, merely for the sake of transmitting some data to the access terminal. Either the access terminal or the access network can determine whether transmission on the secondary sector should be an option, based on consideration of one or more air interface metrics, such as C/I ratios for instance.

The access terminal, for instance, may determine whether the C/I ratio for the secondary sector is sufficiently close to the C/I ratio for the primary sector. If access terminal determines that the C/I ratios are within a threshold of each other, then the access terminal may transmit an expanded DRC request to the access network, specifying both the primary sector and the secondary sector, and the access network may apply the process outlined above. On the other hand, if the access terminal determines that the C/I ratios are not within the threshold of each other (i.e., that the secondary sector's C/I ratio is more than the threshold lower than the primary sector's C/I ratio), then the access terminal may send a conventional DRC request (rather than an expanded DRC request) to the access network, thus not making transmission on the secondary sector an option.

The threshold that the access terminal uses in comparing C/I ratios of the primary and secondary sectors can be programmed into the access terminal or can be specified by the access network, e.g., in a system parameters message broadcast to all served access terminals. Further, the threshold can vary from sector to sector. Still further, the threshold difference in C/I ratios could be characterized as a difference between DRC codes. For instance, the threshold could be one DRC code level, so that the access terminal would send an expanded DRC request only if the access terminal determines that the DRC code for the secondary sector (based on the C/I ratio of the secondary sector) is within one of the DRC code for the primary sector (based on the C/I ratio of the primary sector).

Alternatively or additionally, the access network may determine whether transmission on the secondary sector should be an option. For instance, upon receipt of an expanded DRC request from an access terminal, the access network may compare the DRC codes that the expanded DRC request indicates for the primary and secondary sectors, to determine whether the DRC codes are within a threshold of each other. If so, then the access network may apply the process outlined above. Otherwise, then the access network may disregard the secondary parameters in the expanded DRC request and instead simply treat the expanded DRC request as a conventional DRC request with respect to the primary sector. Alternatively, the access network may consider other air interface parameters as a basis to determine whether to let transmission on the secondary sector be an option.

It should also be understood that the inventive process could extend to involve more than just a secondary sector. For instance, an access terminal could send to the access network a data transmission request (e.g., DRC request) that specifies a primary sector, a secondary sector, and a tertiary sector. If the access network determines that a threshold number of upcoming timeslots on the primary sector are currently scheduled for use to transmit data to one or more other access terminals, then the access network may determine whether at least one of those timeslots is available on the secondary sector. If the access network then determines that each of those timeslots on the secondary sector is also scheduled for use to transmit data to one or more other access terminals, then the access network may determine whether at least one of those timeslots is available on the tertiary sector. If so, the access network may transmit data to the access terminal in the at least one timeslot on the tertiary sector. Otherwise, the access network may conventionally transmit the data to the access network in the primary sector.

Accordingly, in one respect, an exemplary embodiment of the invention may take the form of a method for improved management of data transmission in a wireless communication system. The method may involve (a) receiving into a access network over a wireless air interface from an access terminal a data transmission request specifying at least a primary sector and a secondary sector, (b) responsively making a determination at the access network that (i) a threshold number of upcoming timeslots are currently scheduled for use to carry data to one or more other access terminals in the primary sector and (ii) at least one of those timeslots is available in the secondary sector, and (c) responsive to the determination, scheduling the at least one timeslot for use to transmit data from the access network to the access terminal in the secondary sector.

In this method, the data transmission request may be an expanded Data Rate Control (DRC) request. As such, the request may identify the primary sector with a primary DRC_cover parameter and identify the secondary sector with a secondary DRC_cover, and the request may specify a primary DRC code for the primary sector and a secondary DRC code for the secondary sector. Furthermore, the access network may condition the "making the determination" step on the primary DRC code and secondary DRC code being with a threshold of each other.

The exemplary method may also involve generating the data transmission request at the access terminal, and transmitting the data transmission request from the access terminal over the wireless air interface to the access network. Further, the access terminal may determine SINR (or C/I) and DRC codes for each sector and may include those DRC codes in the data transmission request. And the access terminal may condition including the secondary sector information in the data transmission request on the SINR or (C/I ratio) of the primary sector being within a threshold of the SINR (or C/I ratio) of the secondary sector. Still further, the access terminal may listen for incoming data transmissions on both the primary and secondary sectors.

In another respect, an exemplary method may involve (a) receiving into an access network over a wireless air interface from an access terminal a data transmission request specifying at least a primary sector and a secondary sector, (b) responsively making a first determination at the access network of whether a threshold number of upcoming timeslots are scheduled for use to carry data to one or more other access terminals in the primary sector, and responsive to the first determination being negative, scheduling at least one of the timeslots for use to transmit data from the access network to the access terminal in the primary sector.

The exemplary method may then further involve, responsive to the first determination being positive, making a second determination at the access network of whether at least one of the timeslots is available for use in the secondary sector, and responsive to the second determination being positive, scheduling the at least one timeslot for use to transmit data from the access network to the access terminal in the secondary sector. In this regard, the data transmission request may comprise an expanded DRC request and may further specify a primary DRC code for the primary sector and a secondary DRC code for the secondary sector. And the method may also involve generating and transmitting the data transmission request at the access terminal, and the access terminal then listening for incoming data communications on the primary and secondary sectors.

In addition, the data transmission request may specify a tertiary sector. In that case, the method may further involve, responsive to the first determination being positive, making a second determination at the access network of whether each of the timeslots is currently scheduled for use to carry data to one or more other access terminals in the secondary sector, and responsive to the second determination being negative, scheduling at least one of the timeslots for use to transmit data from the access network to the access terminal in the secondary sector. Still further, the method may involve, responsive to the second determination being positive, making a third determination at the access network of whether at least one of the timeslots is available for use in the tertiary sector and, responsive to the third determination being positive, scheduling the at least one timeslot for use to transmit data from the access network to the access terminal in the tertiary sector.

In this method, the data transmission request may be an expanded DRC request and may specify a primary DRC code for the primary sector, a secondary DRC code for the secondary sector, and a tertiary DRC for the tertiary sector. Further, the method may involve, at the access terminal, generating and transmitting the data transmission request at the access terminal and listening for incoming data communications on the primary, secondary, and tertiary sectors.

The basic operational steps summarized above, and the functional and physical elements that work together to carry them out, comprise a method and system referred to herein as "multi-sector rate control." Further details of multi-sector rate control, including various options of implementation and operation, as well as other aspects, advantages, and alternatives are will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

BRIEF DESCRIPTION OF THE DRAWINGS

FIG. 4 (*a-d*) illustrates exemplary configurations of primary and secondary sectors (a-c) or primary, secondary, and tertiary sectors (d) in relation to an access terminal.

DETAILED DESCRIPTION

Figure 1:
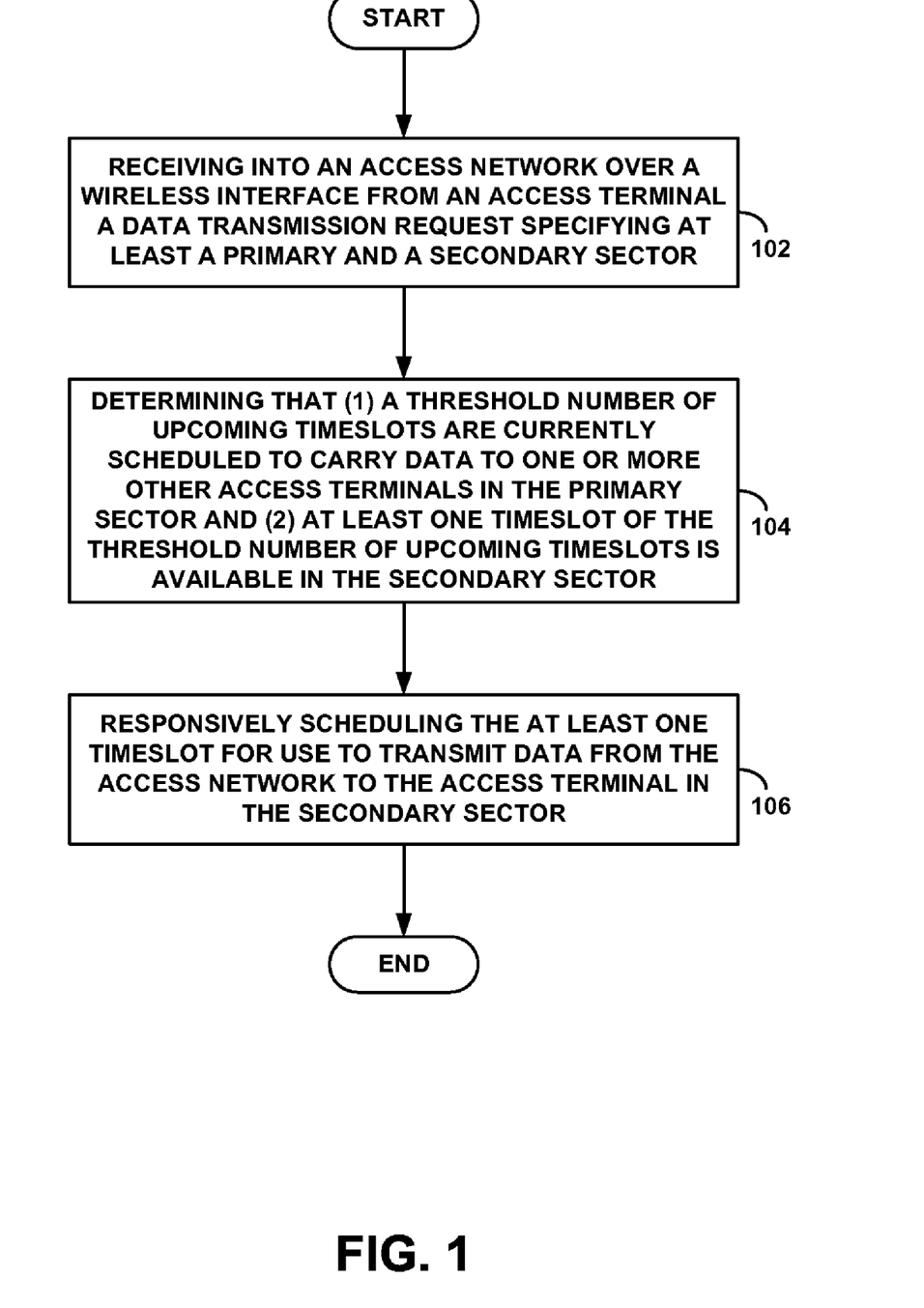
FIG. 1 is a flowchart that illustrates an exemplary embodiment of multi-sector rate control.

Exemplary operation of multi-sector rate control is illustrated in the form a flowchart in FIG. 1. At step 102, an access network receives a data transmission request from an access terminal, wherein the request specifies at least a primary and a secondary sector. As indicated, the request is received over a wireless air interface linking the access terminal and the access network. With reference to the summary above, the request could comprise an expanded DRC request, for instance, although other forms of request are possible as well.

At step 104, a determination is made that (1) a threshold number of upcoming timeslots in the access terminal's primary sector have already been scheduled to carry data to one or more other access terminals in the primary sector; and (2) at least one timeslot of the threshold number of upcoming timeslots is available in the access terminal's secondary sector. For instance, the determination could be made at an RNC that controls both the primary and secondary sectors. Alternatively, the determination could be made by the RNC in combination with the primary and secondary sectors.

In response to the determination made at step 104, at least one upcoming timeslot in the access terminal's secondary sector is used the transmit data to the access terminal, as indicated at step 106. Preferably, the timeslot in the secondary sector occurs earlier than the last of the threshold number of timeslots in the primary sector. Thus, the secondary sector is able to schedule transmission of at least a portion of the access terminal's data sooner than the primary sector. As such, multi-sector rate control enables advantageous scheduling of transmission to the access terminal. When applied to other sectors and other access terminals, multi-sector rate control may offer efficient timeslot scheduling, as well as improved overall system throughput.

FIG. 1 shows only one example of multi-sector rate control. It will be appreciated that additional and/or alternative steps may be included in a flowchart description of multi-sector rate control. The particular illustration of FIG. 1 should not be viewed as limiting with respect to the present invention.

Figure 2:
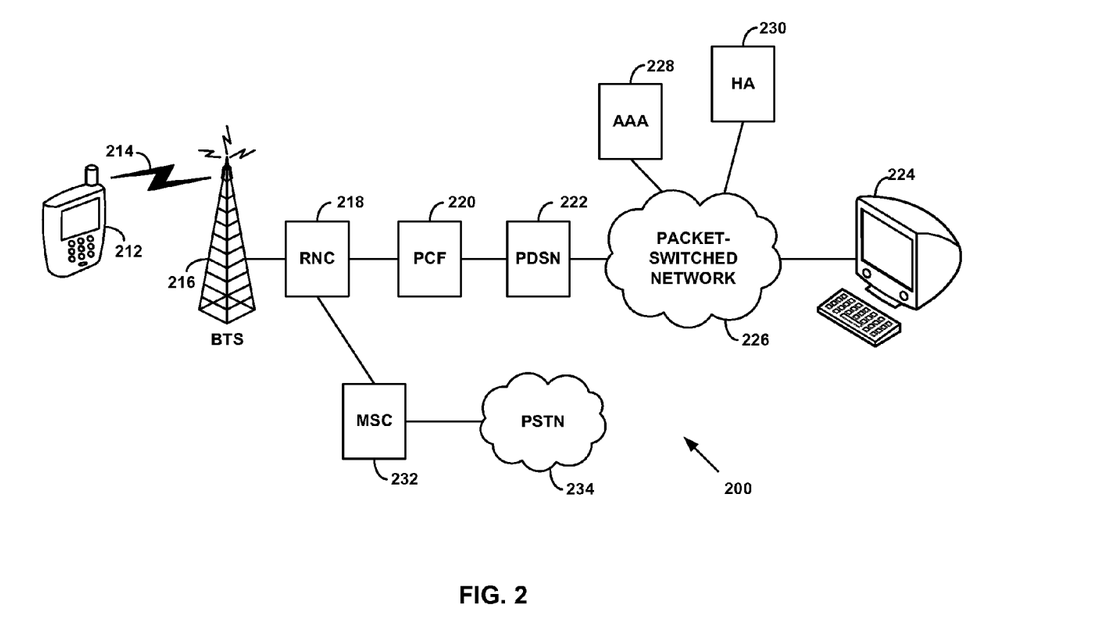
FIG. 2 is a simplified block diagram of a wireless communication system in which an exemplary embodiment of the invention can be employed.

FIG. 2 illustrates an exemplary cellular wireless communication system 200 in which multi-sector rate control could be carried out. The depiction emphasizes primarily aspects adapted to provide wireless packet data communication service for an access terminal (AT) 212. In keeping with the terminology of IS-856, the term "access terminal" (or AT) is used herein to refer generally to a wireless communication device. An AT may also be a device or component that attaches to a computer (e.g., a laptop), thereby enabling the computer to engage in communications via the wireless communication system. AT 212 communicates with the wireless network by way of an air interface 214 link to a BTS 216. Transmissions from BTS 216 to AT 212 are carried over the "forward link" of air interface 214, while transmissions from AT 212 to BTS 216 are carried over the "reverse link." BTS 216 in turn is coupled or integrated with a RNC 218, which is then coupled with packet data serving node (PDSN) 222, by way of packet control function (PFC) 220. PDSN 222 in turn provides connectivity with a packet-switched network 226 such as the Internet and/or a wireless carrier's private core packet-network. Packet-switched network 226 may support a suite of protocols, such as the Internet Protocol (IP), for packet transport, as well as for related protocol layers and services. Sitting as nodes on network 226 are, by way of example, a remote computer 224, an authentication, authorization, and accounting (AAA) server 228, and a mobile-IP home agent (HA) 230.

As illustrated, RNC 218 is also connected to MSC 232, which then provides access to circuit-switched services, as represented by the connection between the MSC and PSTN 234 in the figure. The MSC may also act to control assignment of air traffic channels for communication with an access terminal, as explained further below. Note that MSC 232 could also be connected to one or more other MSCs or other telephony circuit switches in the operator's network, in order to support user mobility across MSC regions or landline long-distance telephone services, for instance.

It should be understood that the depiction of just one of each element in FIG. 2 is illustrative, and there could be more than one of any of them, as well as other types of element not shown. The particular arrangement shown in FIG. 2 should not be viewed as limiting with respect to the present invention.

Without loss of generality in connection with the present invention, operation of wireless communication system 200 may be considered with respect packet-data services. Following authentication by AAA server 228, AT 212 may be assigned an IP address by HA 230. With a communication path comprising air interface 214, BTS 216, RNC 218, PCF 220, PDSN 222, and network 226, AT 212 may then engage in packet-data communications with entities such as remote computer 224.

Figure 3:
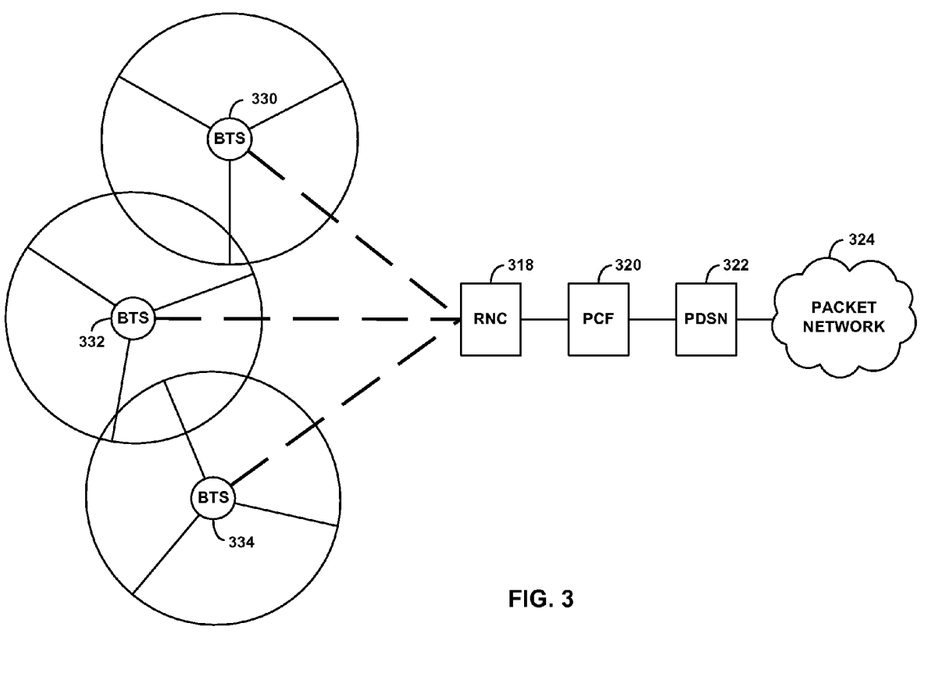
FIG. 3 is a schematic depiction wireless service sectors of a radio node controller, including how sectors may comprise overlapping regions of coverage.

In practice, RNC 218 may control multiple BTSs, each of which may then radiate to define a given cell and a plurality of sectors. FIG. 3 illustrates this arrangement. As shown in FIG. 3, RNC 318 is coupled with three BTSs 330, 332, and 334. Each BTS is shown at the core of a respective circle representing a cell, and each cell is divided into three pie-piece shaped wedges representing sectors. With this arrangement, an access terminal can operate in any of the sectors and can communicate on packet network 324 via its serving BTS, and via RNC 318, PCF 320 and PDSN 322. Note that the depiction of three sectors for each of the BTSs in FIG. 3 is exemplary, and other numbers of sectors per BTS are possible. Further, the relative positions of the BTSs and the relative angular orientations of the wireless service sectors are also illustrative, and other arrangements may be used.

Throughout the present description, the term "base station" will refer to a radio access network element such as a BTS, an RNC, or combination BTS/RNC, for instance. In some configurations, a base station controller (BSC) may carry out some or all of the functions of the RNC, or may be used to introduce an additional layer of hierarchy between the RNC and one or more BTSs. For instance, each of one or more BSCs may control one or more BTSs, and each BSC may in turn be controlled by an RNC. Further, in some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. High Rate Packet-Data Communications

The present invention will be described by way of example with reference to IS-856 communications. However, it should be understood that the invention can apply to other protocols and systems that use time division multiplexing for data transmission.

Under IS 856, each cell employs one or more carrier frequencies, each frequency occupying typically 1.25 MHz of bandwidth, and each sector is distinguished from adjacent sectors by a pseudo-random number offset ("PN offset"). When an access terminal operates in a given sector, communications between the access terminal and the BTS of the sector are carried on a given frequency of the air interface. As described above, air interface communications are divided into forward link communications, which are those passing from the base station to the access terminal, and reverse link communications, which are those passing from the access terminal to the base station. Both the forward link and reverse link communications in a given wireless service sector are encoded by the sector's PN offset, as well as a "Walsh code."

IS-856 leverages the asymmetric characteristics of most IP traffic, in which the forward link typically carries a higher load than the reverse link. Under IS-856, the forward link uses time division multiplexing (TDM), in order to allocate the full forward-link power in a sector to a given user at any moment, while the reverse link retains largely a code division multiplexing access (CDMA) format, according to the well-known standard IS-2000, for example. Unlike CDMA, however, IS-856 includes a "data rate control" (DRC) channel in the reverse link for use by the AT to indicate to the access network the supportable data rate and best serving sector for the forward link. As a result of the full-power allocation by the sector, an access terminal operating under IS-856 can, in theory, receive packet-data at a rate of at least 38.4 kbps and up to 2.4 Mbps.

The IS-856 forward link is divided into timeslots of length 2048 chips, and each timeslot is further time division multiplexed to carry various channels, including a pilot channel, a Medium Access Control (MAC) channel, and, if any traffic exists, a forward traffic channel and a "control" channel. The pilot and MAC channels are together allocated 224 chips twice per timeslot (a total of 448 chips) at pre-assigned positions within each timeslot (i.e., at pre-assigned phases of each slot). The remaining chips are allocated for forward traffic ("data chips") or control. The pilot channel of a given sector carries the identifying PN offset of the sector in a transmission (twice per timeslot) that comprises the pilot signal for the sector. An access terminal operating under IS-856 monitors the respective pilot signal emitted by various sectors to determine their signal strengths, for example according to C/I or SINR, as described above.

Under IS-856, an access terminal conventionally communicates with just a single "serving" sector at any one time, while maintaining a dynamic list of "active" sectors (including the serving sector) that are actively monitored by the AT in order to determine the "best" choice for serving sector. The list of active sectors comprises the AT's "active set," and typically represents the strongest sectors among those monitored by the AT. Thus, the AT selects its serving sector from its active set, possibly updating its selection from time to time as it monitors its active sectors. The active set includes each sector's PN offset as well as its most recently-measured C/I (or SINR). Depending on the system, the number of active sectors in an AT's active set can be up to three or six (according to current standards).

The AT also monitors other sectors that neighbor its active sectors but are not in the AT's active set, and periodically reports all the PN offsets and the corresponding pilot signal strengths it monitors to the base station in a Pilot Strength Measurement Message (PSMM). As conditions change and/or the AT moves about through sectors, the base station in turn may instruct the AT to revise its active set, for example by dropping an active sector that has fallen below a threshold signal strength and adding a new sector that has exceeded the threshold. In this manner, the active set is dynamically adjusted to reflect network conditions as measured by the access terminal. At the same time, the access network is kept appraised of the AT's measurements as reported in the AT's periodic PSMMs to the base station, for instance.

Maintaining and dynamically updating the access terminal's active set as described above facilitates an efficient means of hand off between sectors known as "virtual soft handoff." The access terminal may change its selection of serving sector according to the best current active sector in its active set, while the active set is kept current with the access terminal's view of network conditions in coordination with the access network. When an AT signals a request to switch to a new serving sector, the access network can hand off communications to the new sector generally without breaking or interrupting current or active data communications with the access terminal.

Forward traffic under IS-856 is thus routed to an access terminal on its serving sector, typically the sector that has the strongest pilot strength among the AT's active set. As described above, the access terminal will indicate the serving sector and a requested data rate in a DRC request sent to that sector on the reverse link. Unless and until the AT later selects a different serving sector, only that sector will then serve the access terminal with forward-link data, transmitting them at full power during timeslots allocated for the AT. In turn, the AT will only process and decode transmissions according to the PN offset of its serving sector and its timeslots allocated therein. That is, while other sectors in the AT's active set may also be concurrently transmitting data on their respective forward-link channels, under IS-856, the data will not be intended for the AT, and the AT will not attempt to use the other sectors' PN offsets for decoding. And within its serving sector, the AT will only decode those timeslots that are intended for the AT (identified according to a MAC identifier, as described below).

Under IS-856, specific timeslots are not pre-assigned or reserved for particular access terminals as part of any type of connection establishment. Rather, the entity controlling the AT's serving sector (e.g., a BTS, BSC, RNC, or MSC) typically schedules timeslot transmissions dynamically in near-real-time. The number of timeslots allocated to a particular AT during any given time interval may depend on the volume of traffic intended for delivery to the AT, the number of other ATs being served by the sector and their requested data rates, and the data rate requested by the AT according to its most recently-sent DRC request, among other possible factors. The AT determines the proper data rate to request based on its current measurement of SINR (or C/I, for instance), which in turn corresponds to a particular bit rate per data chip that can be supported by the measured signal to noise conditions. A higher value of SINR (or C/I) at any instant accommodates a higher data rate at that instant.

In practice, an access terminal operating in a wireless communication system network can use stored information to associate measured pilot signal strength and/or SINR with data rate. The AT could maintain the information in memory in the form of a table, for example, which it consults before generating and sending a DRC request. Such a table, incorporating SINR values, could be constructed as follows (Table 1):

TABLE 1

Associating SINR with data rate

| SINR (dB) | Data Rate (kbps) |
|---|---|
| 10.3 | 2,400 |
| 8.0 | 1,800 |
| 3.9 | 1,200 |
| 2.2 | 921 |
| −0.5 | 614 |
| −3.5 | 307 |
| −6.5 | 153 |
| −9.2 | 76 |
| −11.5 | 38 |

By way of example, the values of SINR and associated data rates in Table 1 are adapted from Chapter 4 in "Advances in 3G Enhanced Technologies for Wireless Communications" (note that the original version of this table (Table 4.5 in the cited reference) includes additional gradations of SINR corresponding to different modulation schemes for like data rates; these are omitted here for the sake of brevity). Each value of SINR represents a lower bound (in dB) above which the associated data rate can be supported (and thus requested in a DRC request), and each consecutive pair of SINR values corresponds to a range within which the data rate associated with the lower end of the range may be requested. For instance, a value of SINR between −0.5 dB and 2.2 dB corresponds to a data rate of 614 kbps. As another example, a value of SINR between 8.0 dB and 10.3 dB corresponds to a data rate of 1.8 Mbps, while SINR above 10.3 dB corresponds to a data rate of 2.4 Mbps.

An example of how an AT can select a sector and data rate may be illustrated by considering an AT with just two sectors, Sector A and Sector B, in its active set. Let the AT measure a pilot strength of −80.0 dBm for Sector A and −80.1 dBm for Sector B. Also, assume that the AT measures −85 dBm of interference from other sources, including other sectors not in its active set and thermal noise, for instance. Since the AT measures a stronger signal from Sector A, it will select Sector A as its serving sector. Taking the measured strengths of Sector A, Sector B, and other interference to be $P_A$, $P_B$, and $P_{other}$, respectively, SINR may then be calculated as $P_A - P_B - 10\log_{10}[1+10^{(P_{other}-P_B)/10}]$ dB. For the exemplary values given above, this formula yields SINR=−1.1 dB (rounded to the nearest tenth). Referring to Table 1, then, the AT would select a data rate of 307 kbps in its DRC request to the controlling entity of Sector A. The above formula can easily be extended to account for additional pilot signals in the AT's active set.

Operation in an IS-856 compliant communication system may be illustrated with reference to FIG. 2. To acquire packet data connectivity under IS-856, after AT 212 first detects an IS-856 carrier, the access terminal sends to its serving RNC (or BSC) 218 a UATI (Universal Access Terminal Identifier) request, and receives in response an UATI, which the access terminal can then use to identify itself in subsequent communications with the BSC. The access terminal then sends a connection-request to the RNC 218, and the RNC responsively invokes a process to authenticate the access terminal and to have the access terminal acquire a data link.

In particular, the RNC 218 sends an access request to an Access Network AAA (ANAAA) server (which may be different than the AAA server 228), and the ANAAA server authenticates the access terminal. The RNC 218 then assigns radio resources for the data session, providing a MAC identifier to AT 212 for identifying its timeslot data sent in the forward-link traffic channel, and a Walsh code for a sending data on the reverse-link traffic channel. Further, the RNC signals to the PDSN 222 (via PCF 220), and the PDSN and access terminal then negotiate to establish a PPP data link. In addition, the access terminal then sends an MIP RRQ to the PDSN, which the PDSN forwards to the HA 230, and the HA assigns a mobile-IP address for the access terminal to use.

Once the access terminal has acquired an IS-856 radio link, a data link, and an IP address, the access terminal is considered to be in an active mode. In active mode, the AT receives its data distributed across MAC-identified timeslots transmitted by the BTS using the full power of the forward link of the serving sector selected by the AT (as described above). Thus, the access terminal recognizes its timeslot data from among other timeslots by a MAC identifier included in each transmission, and processes only those timeslots with the AT's assigned MAC identifier. Using the full power of the forward link maximizes the signal to noise ratio, thus facilitating higher rate data communication than the power-limited CDMA channels.

Further, if the access terminal does not send or receive data for a defined period of time, the access terminal enters a dormant mode. In the AT's dormant mode, an IS-856 system maintains the logical state of the access terminal's session (e.g., IP address, PPP state, and radio link session information), while releasing the access terminal's radio link resources (e.g., the MAC identifier that had been assigned for use by the access terminal). With the maintained session state, the access terminal can quickly re-acquire a radio link so as to send or receive packet data, thereby giving the appearance that the access terminal is "always on."

2. Multi-Sector Rate Control

Under IS-856, the timeslots of all the various sectors are synchronized. Thus, while different sectors may be transmitting on their respective forward links to different ATs, the sequencing and timing of timeslots in the different sectors is the same. Consequently, a given AT monitoring its active sectors will receive the pilot signals from all the active sectors at the same time instants (ignoring small variations due to possibly differing propagation delays and possible multi-path reflections). Similarly, the given AT will observe time-alignment of the forward-link timeslots from all of its active sectors, as well as from any other detectable sectors not currently in the AT's active set. In accordance with the description above, however, the given AT will only decode timeslots in its serving sector that are destined for the AT, as determined by matching the MAC identifier of timeslot with that of the AT.

During any particular communication from the network to the given access terminal, multiple forward-link timeslots may need to be allocated in order to accommodate successful and complete transmission of associated data to the access terminal. The number of timeslots could depend on the amount of data to be transmitted, as well as the current data rate (e.g., as determined by SINR), among other factors. As described above, timeslots in a particular sector are not pre-assigned to access terminals in that sector. Rather, data bound for a given AT are dynamically scheduled in timeslots of the AT's serving sector according to one or more scheduling algorithms, for example. Scheduling algorithms could take account of various factors, including, without limitation, traffic load to all ATs in the particular sector, priority of ATs, and the type of application carried in a transmission (e.g., real-time vs. best-effort). In general, as the traffic load bound to different ATs in a particular sector increases, the frequency with which upcoming timeslots are assigned to any one AT in that sector may decrease, and AT-bound data may need to be buffered or queued. Consequently, the scheduling of data in successive timeslots of a multi-timeslot transmission to a given AT in that AT's serving sector may be subject to increasing delays as the available timeslots in that sector are shared among more and more other access terminals.

At the same time, the traffic load in one or more of the given AT's other active sectors may be lower than that in the AT's serving sector. In particular, there could be upcoming timeslots in one (or more) of the AT's other active sectors that are available for transmissions to the AT sooner than corresponding (synchronized) timeslots in the AT's serving sector. However, under conventional operation according to IS-856, there is no way to make use of those timeslots of the other active sector or sectors for the AT during the time that the AT has designated its current serving sector. The present invention makes it possible to utilize the timeslots of one or more of the AT's active sectors if any one of those timeslots offers advantageous scheduling of transmissions to the given AT.

More specifically, the given access terminal may identify to the access network both a primary and a secondary sector from which it may receive forward-link data transmission, and indicate appropriate data rates for each. Preferably, both the primary and secondary sector will be members of the AT's active set. Alternatively or additionally, the access network may determine that a one or more of the AT's active sectors (besides its serving sector) is suitable as a secondary sector. (The identification of a secondary sector is described in more detail below.) At the same time, the access terminal, having identified to the network its primary and secondary sectors, will listen for data transmissions from both. In this way, the access terminal can be prepared receive data from either its primary or secondary sector, without necessarily knowing ahead of time which one of the two will be transmitting.

Further, the access network may keep track of the scheduling of all AT-bound data in the timeslots of its various sectors, including in the given AT's primary and secondary sectors. In particular, the access network may determine that a number of upcoming timeslots in the given AT's primary sector have already been allocated for use to transmit data to one or more other access terminals in the same sector. The number applies to the upcoming of timeslots in sequence, and thus data bound for the given AT will be scheduled no sooner than the next timeslot following the already-allocated number of timeslots. For instance, if the next three upcoming timeslots have already been allocated to other access terminals, the data bound for the given AT can be scheduled for transmission no sooner than the fourth upcoming timeslot. In other words, the number of already-allocated upcoming timeslots corresponds to a minimum scheduling delay in the given AT's serving sector.

The term "reserved timeslots" will be used herein to refer to upcoming timeslots in any sector that have already been allocated to one or more access terminals other than a given access terminal. The minimum delay resulting from a particular number of reserved timeslots shall be referred to herein as a "timeslot-scheduling delay."

In accordance with a preferred embodiment, if, in the primary sector, the number of reserved timeslots exceeds a threshold number, then the access network may attempt to schedule timeslot transmission of at least a portion of the given AT's undelivered data in the AT's secondary sector, provided the secondary sector can accommodate more favorable scheduling than the primary sector. More favorable scheduling could comprise a determination that the number of reserved timeslots in the secondary sector does not exceed the threshold number, and thus, at least one timeslot could be available for the given AT in the secondary sector sooner than in the primary sector. Alternatively, more favorable scheduling could comprise a more precise determination that the secondary sector could accommodate scheduling in specific timeslots, again ahead of possible scheduling in the primary sector. Other criteria for more favorable scheduling are possible as well. In any case, as a consequence, data bound for the given AT would be subject to a smaller timeslot-scheduling delay in the secondary sector than in the primary sector of the given AT, assuming the secondary sector is able to allocate at least one of its earlier-available timeslots for transmission to the given AT. Under these or similarly-favorable conditions, transmission to the given AT in its secondary sector may offer a scheduling advantage to the given AT. Further, when applied to other access terminals operating in the various sectors of the access network, multi-sector rate control may also result in more efficient use of the access network's timeslots in general and yield improved overall system throughput.

The threshold number of reserved timeslots could correspond to a timeslot-scheduling delay that may be tolerated before the access network attempts to alleviate the delay by enlisting secondary sectors. The threshold could be set according to a system parameter. For instance, each sector could use the same threshold number, which it would then apply to any access terminal with outstanding data that is not scheduled within the threshold number of upcoming timeslots. Alternatively or additionally, the threshold number could vary according to sector identity. As yet a further possibility, the threshold number could be set on a per-AT basis, for example, according to the type of application that is being supported by the communication link. For instance, real-time applications, such as "voice over IP" (VoIP) might require a tighter (smaller) threshold than non-real-time applications, such as bulk file transfers (e.g., email). Other means and/or rationale for setting the threshold number may be possible as well.

Note that the forward-link data rates of the primary and secondary sectors may not be the same. In particular, if the rate in the secondary sector is smaller than that in the primary sector, the transmission in the secondary sector will be slower on a per-timeslot basis. However, there may still be an overall gain in transmission rate to the give AT, depending on the relative rates of the primary and secondary sectors, as well as on the relative timeslot delays of the two sectors. That is, a smaller timeslot-scheduling delay could more than compensate for a lower data rate in the secondary sector. In addition, it should be noted that the condition of comparing the number of reserved timeslots in the primary sector to the threshold number need not be defined exclusively as "exceeding the threshold." For instance, the condition could be determined as equaling or exceeding.

Preferably, the active sectors of the access terminal will be under the control of a common network entity. Without loss of generality, the controlling entity will be taken herein to be an RNC, although it will be appreciated that other controlling network elements are possible (e.g., a BSC, BTS, or MSC). Each sector in an access network will typically receive data from the RNC for all the access terminals operating in that sector, and each sector will independently schedule the AT-bound data in its respective timeslots, for instance according to a scheduling algorithm, as described above. Conventionally, under IS-856, the RNC will route data for a given AT only to that AT's current serving sector. In accordance with multi-sector rate control described herein, however, the RNC will advantageously route the given AT's data to all of the AT's active sectors simultaneously. By doing so, each of the given AT's active sectors, besides the serving (primary) sector, will already be supplied with the AT's data in the event that the RNC, under the conditions described above, requests any one of the active sectors to act as a secondary sector and transmit data to the AT. In turn, a particular active sector that is requested to act as a secondary sector for the AT will then schedule at least a portion of AT's data in one or more of its available upcoming timeslots, subject to the sector's scheduling algorithm.

More specifically, the primary sector of a given access terminal will send a message (or other communication) to the RNC when the threshold number of reserved timeslots has been reached for that AT. The RNC may then determine (or possibly already know) which sector should be selected as a secondary sector for the AT, as well as the appropriate data rate to use in transmitting to the AT. The RNC will then send a request to the selected sector, instructing it to attempt to transmit data to the access terminal at an indicated data rate. At some later time when the number of reserved timeslots for the AT falls below the threshold in the AT's primary sector, the primary sector may similarly inform the RNC that the threshold condition no longer holds. In turn, the RNC may then instruct the secondary sector to stop attempting to transmit data to the access terminal. Since the access terminal will be listening to both sectors, it will be able to receive data from which ever one transmits to it.

Note that the request from the RNC to the secondary sector may include an indication of one or more specific timeslots in which to schedule transmissions to the access terminal. Alternatively, the request may simply indicate that the secondary sector should transmit according to best-effort scheduling. Other forms of request are possible as well. Further, the secondary sector may respond to the request, indicating whether or not it is able to accommodate the transmission. For instance, the secondary sector may also have exceeded its threshold number of reserved slots for the AT, and may therefore inform the RNC that it cannot accommodate the request. Alternatively, the secondary sector may not respond to the request, whereby the request may be assumed to be a best-effort request.

When the RNC sends its request to the secondary sector, the secondary sector will already have the data to be transmitted to the AT, as described above. Since a portion of that data may have already been transmitted from the primary sector to the AT prior to the threshold condition arising, the RNC will also indicate to the secondary sector a starting point in the AT's data. For instance, if the AT's data is comprised of 10 packets, and three were successfully transmitted by the AT's primary sector before the threshold condition occurred, then the RNC will indicate to the secondary sector that it should begin transmission at the fourth packet.

Under IS-856, each sector tracks the status of its transmissions to access terminals, and in turn reports its progress relating to each access terminal back to the RNC. In practice, an access terminal will send a positive acknowledgement, or ACK, when it successfully receives a packet from the sector. Conversely, the access terminal will send a negative acknowledgement, or NACK, if it fails to successfully receive a packet. As described above, transmission of a packet may be distributed over an allocated number of sequential, interleaved timeslots of a sector, wherein successful transmission may occur within fewer than the allocated number of timeslots, and unsuccessful transmission corresponds to failure to receive the entire packet within the allocated number. In either case, the sector may use ACKs and NACKs from a given access terminal to report progress back to the RNC for that access terminal. Thus, the RNC may be kept aware of the progress of data transmission to the given access terminal in its primary sector in anticipation of requesting a secondary sector to attempt transmission to the access terminal.

Similarly, the secondary sector will report progress in transmitting to the given access terminal (e.g., according to ACKs and NACKs) to the RNC. Thus, when the primary sector informs the RNC that the number of reserved timeslots for the given AT has fallen below the threshold, the RNC may in turn indicate to the primary sector where in the AT's data the sector should pick up its transmission. The RNC will also then instruct the secondary sector to cease transmitting to the access terminal, as described above. Thus through tracking the progress of transmissions to a given AT in both its primary and secondary sectors, the RNC may coordinate which of these two sectors is currently attempting to transmit to the AT, and where in any outstanding data for the AT each should pick up when one or the other sector begins transmitting.

The approach to multi-sector rate control with a primary and secondary sector can be extended to include additional sectors beyond a secondary sector. As an example, if the number of reserved timeslots has exceeded the threshold in both the primary and secondary sectors, the RNC could then request that a tertiary sector attempt to transmit to the access terminal. As with just primary and secondary sector, the RNC could coordinate transmissions to the access terminal from among the three sectors. Additionally, the access terminal would preferably listen for transmissions from all three sectors. In a similar manner, further sectors beyond a tertiary sector could be added. Although the methodology for extending the number of sectors is straightforward, the remaining discussion will focus only on application to a primary and secondary sector.

The above discussion describes how the access network may determine that the secondary sector for a given AT should be enlisted to transmit to the AT, as well as how the access network (e.g., the RNC) coordinates and manages transmissions from both a primary and secondary sector. Another important aspect of multi-sector rate control is how and when both a primary and secondary sector are identified for a given AT, including a determination of an appropriate data rate for each. This generally relates to monitoring sector signal strength (e.g., SINR or C/I) to determine when conditions are appropriate or favorable for supporting both primary and secondary sector transmissions in the manner described above.

Figure 4:
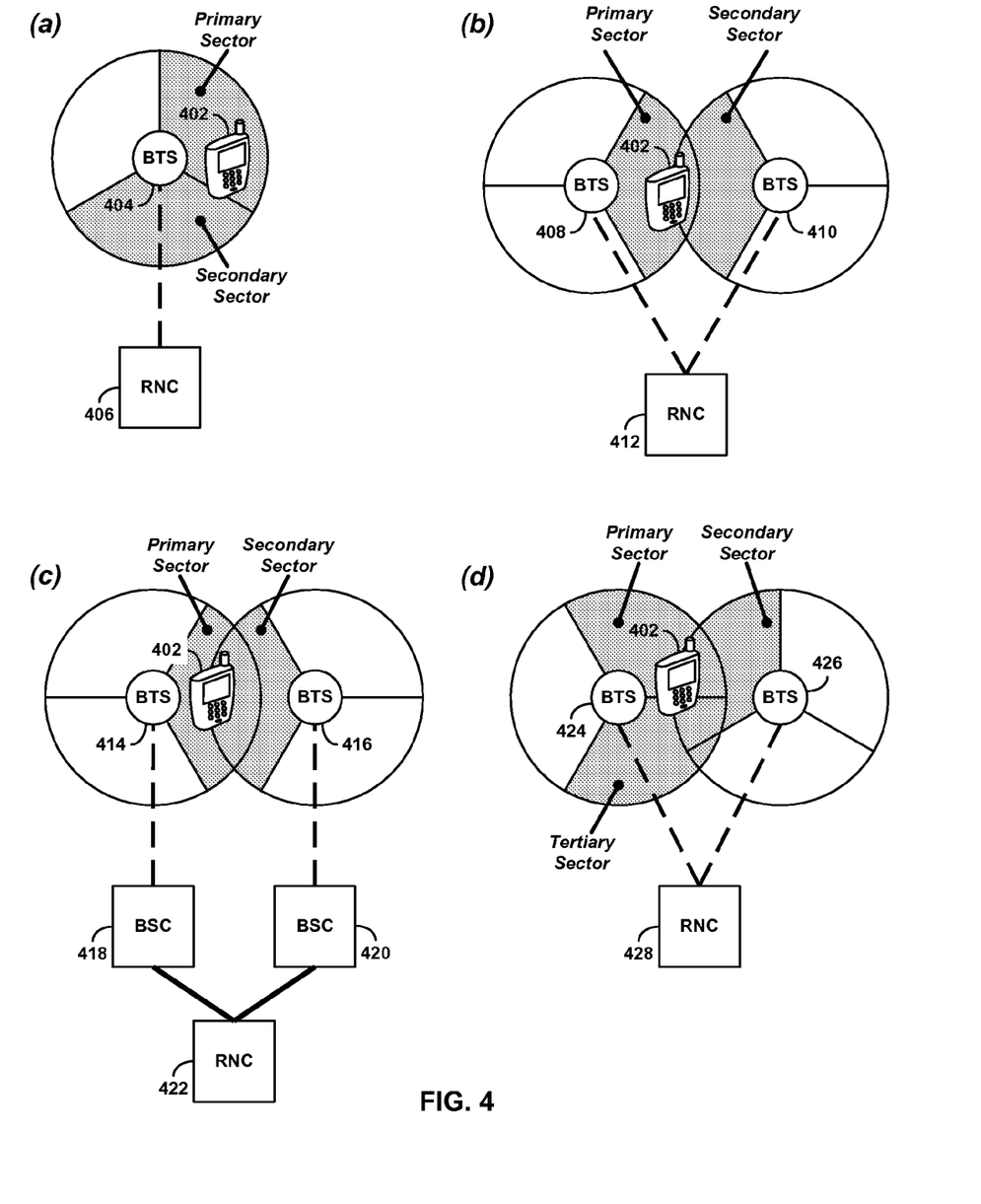

FIG. 4 (a-d) illustrates exemplary configurations in which an access terminal could have a primary sector and a secondary sector (a-c) or a primary, secondary, and tertiary sector (d). In FIG. 4 (a), a single BTS 404 having three sectors is shown to be under the control of RNC 406. Access terminal 402 is shown to be operating in one of the sectors, identified as its primary sector, but close to the boundary with another sector, identified as its secondary sector. The primary and secondary sectors are shown shaded in gray. In accordance with the exemplary embodiment, both the primary and secondary sectors may be members of the access terminal's active set. Further, in this configuration, either RNC 406 or BTS 404 could be the controlling entity that coordinates the sectors operation of multi-sector rate control.

FIG. 4 (b) illustrates a configuration in which two BTSs, 408 and 410, are under the control of RNC 412. Each BTS is depicted as radiating three sectors, two of which (shaded in gray)—one from each sector—share an overlapping region. Access terminal 402 is shown to be operating in the gray-shaded sector of BTS 408, but close to (or possibly in) the region of overlap with the gray-shaded sector of BTS 410. As indicated, the gray-shaded sector of BTS 408 is identified as the primary sector for AT 402, while the gray-shaded sector of BTS 410 is identified as the secondary sector. As with FIG. 4 (a), both the primary and secondary sectors may be members of the access terminal's active set.

FIG. 4 (c) is similar to 4 (b), except that each BTS 414 and 416 are under the control of separate BSCs 418 and 420, respectively. In turn, each BSC is under the control of RNC 422, which preferably is the controlling entity that coordinates the sectors operation of multi-sector rate control. As with FIG. 4 (b), the primary and secondary sectors of AT 402, shaded in gray, are associated with different BTSs.

In FIG. 4 (d), two BTSs 424 and 426 are under the control of RNC 428. Access terminal 402 is shown to be operating in a primary sector associated with BTS 424, while having a secondary sector that is associated with BTS 426 and a tertiary sector also associated with BTS 424. The primary, secondary, and tertiary sectors, all shown shaded in gray, could be members of the active set of AT 402. In this configuration, either RNC 428 could be the controlling entity that coordinates the sectors operation of multi-sector rate control.

It will be appreciated that FIG. 4 (a-d) illustrates only a four configurations sectors and controlling entities in which multi-sector rate control could be embodied, and other arrangements are possible as well.

Two approaches may be employed in identifying a secondary sector for an access terminal, namely one in which the access terminal makes the basic determination, and another in which the access network makes the basic determination. In practice, a combination of both methods may be used in order to ensure robust operation, for instance. Each of the two approaches is described by way of example in the next two subsections.

a. Identification a Secondary Sector by an Access Terminal

In keeping with the preferred embodiment described above, the sectors of the AT's active set may be under the control of a common RNC, referred to as the AT's serving RNC. When the AT sends a DRC request to its serving RNC by way of the AT's serving sector, it designates its serving sector as its "primary sector" using a "primary DRC_cover" as in conventional operation under IS-856. In accordance with the preferred embodiment, AT will further designate a choice for a "secondary sector" using a "secondary DRC_cover." For instance, the secondary sector could be a sector in the AT's active set having the second strongest pilot signal (the strongest signal belonging to the AT's primary sector). As a further aspect of identifying a secondary sector, the AT may require that the pilot signal strength of a second-strongest active sector be within a prescribed threshold of the pilot signal strength of the AT's primary sector. For instance, the AT may impose a threshold of 2 dB, such that the second-strongest active sector will be selected as a secondary sector only if its pilot signal strength is within 2 dB of the primary sector's pilot signal strength. If not, then the AT may forgo selecting a secondary sector. Other threshold values could be used, and threshold values need not necessarily be specified in dB.

In addition to identifying primary and secondary sectors, the AT may also indicate a DRC code for each of the primary and secondary sector, namely a "primary DRC code" and a "secondary DRC code," respectively. The AT may base the respective DRC code on SINR for the associated sector, for instance. Since SINR could be different for the primary and secondary sectors (albeit within the limit set by a threshold value), the primary and secondary sectors could have different data rates.

As an example, suppose a given AT's primary sector, Sector A, has a pilot signal strength (as measured by the AT) of $P_A=-79$ dBm, and suppose the AT's secondary sector, Sector B, has a pilot signal strength of $P_B=-80$ dBm. (It is assumed here that the power difference, $\Delta P=1$ dB, is within the threshold of signal-strength differential.) Further assume that, as in the example in §1 above, the AT measures $P_{other}=-85$ dBm of interference from other sources, including other sectors not in its active set and thermal noise, for instance. Then applying the formula introduced above for SINR, $P_A-P_B-10\log_{10}[1+10^{(P_{other}-P_B)/10}]$, yields $SINR_A=-0.2$ dB, and from Table 1, the air interface link could support a data rate of 614 kbps. The AT would thus select a primary DRC code corresponding to this rate. The SINR value for Sector B can be obtained by reversing the roles of $P_A$ and $P_B$ in the formula, which yields $SINR_B=-2.0$ dB, corresponding to a data rate of 307 kbps. Thus the AT would select a secondary DRC code corresponding to 307 kbps. In this example, data rates of the primary and secondary sector would differ by a factor of two.

As another example, suppose as illustrated in §1 above, $P_A=-80.0$ dBm, $P_B=-80.1$ dBm, and $P_{other}=-85$ dBm. Then as determined above, $SINR_A=-1.1$ dB, corresponding to a data rate of 307 kbps. Again, reversing the roles of $P_A$ and $P_B$ in the formula for SINR yields $SINR_B=-1.3$ dB, also corresponding to a rate of 307 kbps. Thus in this case, both the primary and secondary DRC codes would be the same.

The threshold value of signal-strength differential used to determine whether or not the AT selects a secondary sector limits how much weaker than a primary sector that a prospective secondary sector may be before the corresponding difference in data rate outweighs the possible benefit that secondary-sector timeslot scheduling might yield. As such, the threshold could itself be defined in terms of DRC code. For instance, the threshold could limit the difference in DRC code between a primary and secondary sector such that the corresponding difference in data rate is no more than the difference between adjacent ranges as defined by way of example in Table 1.

The threshold value, whether define in terms of signal strength or in terms of DRC code, could be set according to a system parameter. For instance, the serving RNC could supply each access terminal with the same threshold value. Alternatively or additionally, the threshold value could be dependent on the identity of the AT's primary sector, so that different values are used in different sectors. As yet a further possibility, the threshold value could be set according to the type of application that is being supported by the communication link. For instance, real-time applications, such as VoIP might require a tighter (smaller) threshold than non-real-time applications, such as bulk file transfers (e.g., email). An application-related threshold could, therefore, vary from one AT to another, according their respective applications. Other means and/or rationales for setting the threshold value may be possible as well.

Preferably, the DRC request format used conventionally in IS-856 to carry the DRC_cover and DRC code of just the serving sector will be modified to accommodate these two parameters for the secondary sector as well (and with the serving sector being designated as the primary sector). As noted above, the term "expanded DRC request" will be used to designate this modified form of DRC request. Thus, having generated an expanded DRC request as described above, the access terminal may then send the expanded DRC request to its serving RNC by way of the AT's serving sector, transmitting the request in a DRC channel over the reverse link to the serving sector.

Then, if during the time that a given AT has identified a particular pair of active sectors as its primary and secondary sectors the RNC is informed by the primary sector that the threshold number of reserved timeslots for the AT has been exceeded, the RNC will request the secondary sector to transmit to the access terminal at a rate corresponding to the secondary DRC code. As with a conventional DRC request, the access terminal may continually update its primary and secondary sector designations, together with their respective DRC codes. Having identified primary and secondary sector and corresponding data rates in an expanded DRC request, the AT will then listen for transmissions on its air links to both sectors.

b. Identification a Secondary Sector by an Access Network

Identification by the access network of a secondary sector for an access terminal may be carried out in a similar manner to identification by the access terminal. In particular, since the access terminal continually updates the access network with signal-strength measurements of its active set (as well as possibly other sectors not in its active set), the access network will generally have at its disposal the same information that the access terminal uses to identify a secondary sector and to determine an appropriate data rate.

In the context of the preferred embodiment discussed above, the serving RNC for a given AT may receive periodic PSMMs from the AT, and thus be aware of the pilot signal strengths measured by the AT for its active sectors, as well for other sectors represented in its PSMMs. Then, if the AT's primary sector informs the RNC that the threshold number of reserved timeslots has been exceeded for the AT, the RNC may select a secondary sector and corresponding data rate according to the latest PSMM from the AT, and request that sector to transmit to the AT. In this embodiment, the AT may listen for transmissions from its primary sector and any other sector with sufficient signal strength (as determined by a threshold test, for instance). Since the AT will have been the source of the measurements used by the RNC, the AT will also know the appropriate data rate that will be received.

Even if the RNC makes the identification of the secondary sector, the AT may still send expanded DRC requests with its own identifications of primary and secondary sectors. Then if the RNC determines that secondary-sector transmission is warranted, it may use the PSMM measurements to confirm that the relative signal-strengths are within the threshold value, or to possibly apply a different threshold. Again, the AT will listen for transmissions from any of its active sectors having sufficient signal strength to act as a secondary sector.

3. Exemplary Operation of Multi-Sector Rate Control

Figure 5:
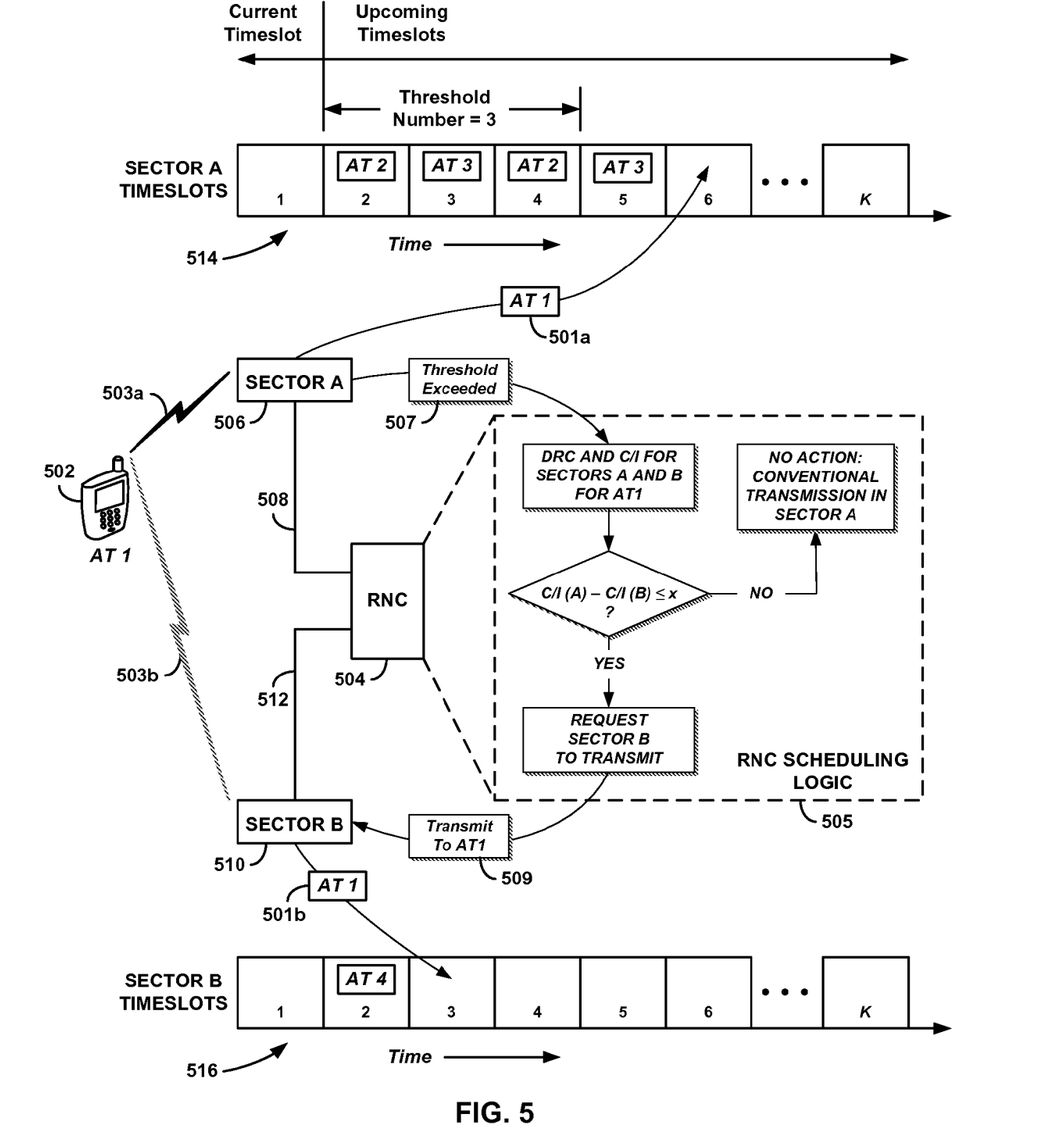
FIG. 5 is an exemplary representation of multi-sector rate control for the situation in which a secondary sector has available timeslots for transmission of data to an access terminal.

Exemplary operation of multi-sector rate control may be understood with reference to FIG. 5, which is a schematic representation of the interactions between certain elements of an access network and an access terminal involved in the process. In the figure, AT 1 502 communicates with its primary sector, Sector A 506, by way of air interface 503*a*, and with its secondary sector, Sector B 510, by way of air interface 503*b*. As a visual cue that Sectors A and B are the AT's primary and secondary sectors, air interfaces 503*a* and 503*b* are depicted in black and gray, respectively. Sectors A and B are in turn coupled with RNC 504 by way of communication links 508 and 512, respectively. These links could comprise standard signaling backhaul interfaces, for instance.

A portion of the controlling functionality of RNC 504 is carried out by RNC Scheduling Logic 505, represented by a segment of flowchart logic bounded within a dashed box as shown. Scheduling Logic 505 is not intended to depict the complete scheduling logic of RNC 504, but rather just a portion of decision logic related to exemplary operation of multi-sector rate control.

Sector A schedules data transmissions to access terminals in timeslots 514. Represented schematically, timeslots 514 comprise timeslots numbered 1, 2, 3, 4, 5, 6, . . . , K. As indicated by the arrows at the top of the figure, timeslot #1 is the current timeslot (i.e., in transmission), and timeslots 2, 3, 4, 5, 6, . . . , K are upcoming timeslots. Also as indicated, time increases toward the right, with increasing timeslot number. By way of example, the threshold number of reserved timeslots is taken to be three, as indicated by the arrows at the top of the figure. Timeslots for Sector B are similarly represented as timeslots 516, which are synchronized with timeslots 514 of Sector A. The arrows at the top of the figure depicting the current and upcoming timeslots and the threshold number apply to timeslots 516 or Sector B, as well.

In addition to depicting certain elements and components, FIG. 5 represents an exemplary operational snapshot or momentary time window of multi-sector rate control. As indicated, upcoming timeslots 2, 3, 4, and 5 of Sector A are allocated for interleaved data transmissions to access terminals AT 2 and AT 3 (these ATs are not shown in the figure). Data to these access terminals is represented by rectangles labeled "AT 2" and "AT 3." Preferably, these data will be in the form of packets, although other units of data for transmission are possible as well. In Sector B, upcoming timeslot #2 is allocated to AT 4 (also not shown). Thus according to the threshold number of three, Sector A has exceeded its threshold number for AT 1, while Sector B has not.

Under the condition as depicted that more than three upcoming timeslots of Sector A are allocated to ATs other than AT 1, Sector A 506 informs RNC 504 that the threshold is exceeded. By way of example, Sector A sends a "Threshold Exceeded" message 507 to the RNC, where it is processed within RNC Scheduling Logic 505. The message could be sent by way of communication link 508, for example, although, for illustrative purposes, it is depicted as being directed to the first logic block of Scheduling Logic 505.

Responsive to receiving message 507, RNC 504 then decides whether or not to enlist Sector B as the secondary sector of AT 1. Preferably, RNC Scheduling Logic 505 has DRC codes and C/I (or SINR) for both Sectors A and B, as indicated in the first logic block. This information may have been acquired from the latest expanded DRC request or PSMM from AT 1, or some combination thereof. The RNC (logic) then checks if the signal strengths of Sectors A and B are within a threshold value, taken to be "x" in the figure.

If they are, then the RNC invokes secondary-sector scheduling. This is indicated by the logic branch labeled "YES" and the "Transmit To AT 1" message 509 sent from RNC 504 to Sector B. The message could be sent by way of communication link 512, for example, although, for illustrative purposes, it is depicted as being directed from the logic block that generates the message directly to Sector B. Responsive to receiving message 509, Sector B schedules AT 1 data 501*b* for transmission in a timeslot after timeslot #2. In the current example snapshot of FIG. 5, timeslot #3 is used. However, other timeslots after timeslot #3 could be used as well. Since AT 1 is listening for transmissions from both Sectors A and B, it will be prepared to receive this secondary-sector transmission.

If the signal strengths of Sectors A and B are not within the threshold value, then secondary sector scheduling is not invoked, and conventional scheduling is used. This is indicated by the logic branch labeled "NO." In this case, AT 1 data 501*a* is scheduled for transmission in Sector A in an available timeslot after timeslot #5. In the current example snapshot of FIG. 5, timeslot #6 is used. However, other timeslots after timeslot #5 could be used as well. Note that AT 1 data 501*a* and 501*b* represent different local copies at Sectors A and B, respectively, of the same data content. Again, AT 1 will be prepared to receive transmissions from Sector A.

FIG. 5 is exemplary of only certain salient aspects of operation of multi-sector rate control, as well as only certain of the elements of an access network. As a snapshot of operation, it will be appreciated that not all conditions that might arise during operation are represented. For instance, Sector B could also have more than the threshold number of reserved timeslots scheduled. In this case, it may not be able to offer better scheduling than Sector A. Further, it should be understood that other steps and/or communications between elements could be included as well. For instance, Sector B 510 could respond to RNC 504 with an indication of whether or not the request for secondary-sector scheduling can be advantageously accommodated by Sector B. Other aspects of operation, such as tracking the progress of transmissions to AT 1 are omitted from FIG. 5 for the sake of brevity. Omission of any particular aspect or state of operation from FIG. 5 should not be viewed as limiting with respect to the present invention.

4. Conclusion

An exemplary embodiment of the present invention has been described above. Those skilled in the art will understand, however, that changes and modifications may be made to this embodiment without departing from the true scope and spirit of the invention, which is defined by the claims.

We claim:

1. In an access network, a method comprising:
receiving into the access network over a wireless air interface from a given access terminal a data transmission request specifying at least a primary sector and a secondary sector;
in response to the received data transmission request, making a determination at the access network that (i) in the primary sector a threshold number of upcoming timeslots are currently scheduled for use to carry data to one or more other access terminals prior to any timeslot available to carry data to the given access terminal, and (ii) at least one timeslot is available in the secondary sector to carry data to the given access terminal sooner than the any timeslot available in the primary sector; and
in response at least to the determination, scheduling the at least one timeslot for use to transmit data from the access network to the given access terminal in the secondary sector.

2. The method of claim 1, wherein the data transmission request comprises an expanded Data Rate Control (DRC) request.

3. The method of claim 2, wherein the expanded DRC request identifies the primary sector with a primary DRC_cover parameter and identifies the secondary sector with a secondary DRC_cover.

4. The method of claim 3, wherein the expanded DRC request further specifies a primary DRC code for the primary sector and a secondary DRC code for the secondary sector.

5. The method of claim 4, further comprising:
the access network further conditioning the determination on the primary DRC code and secondary DRC code being within a threshold of each other.

6. The method of claim 1, wherein the access network comprises a radio network controller at which the method is carried out.

7. In an access network, a method comprising:
receiving into the access network over a wireless air interface from a given access terminal a data transmission request specifying at least a primary sector and a secondary sector;
in response to the received data transmission request, making a first determination at the access network of whether a threshold number of upcoming timeslots are scheduled for use to carry data to one or more other access terminals in the primary sector prior to any timeslot available in the primary sector to carry data to the given access terminal;
in response at least to the first determination being negative, scheduling at least one timeslot of the upcoming timeslots for use to transmit data from the access network to the given access terminal in the primary sector;
in response to the first determination being positive, making a second determination at the access network of whether at least one timeslot is available for use in the secondary sector to carry data to the given access terminal sooner than the any timeslot available in the primary sector; and
in response at least to the second determination being positive, scheduling the at least one timeslot for use to transmit data from the access network to the given access terminal in the secondary sector.

8. The method of claim 7, wherein the data transmission request comprises an expanded Data Rate Control (DRC) request and further specifies a primary DRC code for the primary sector and a secondary DRC code for the secondary sector.

9. In an access network, a method comprising:
receiving into the access network over a wireless air interface from a given access terminal a data transmission request specifying at least a primary sector, a secondary sector, and a tertiary sector;
in response to the received data transmission request, making a first determination at the access network of whether a threshold number of upcoming timeslots are scheduled for use to carry data to one or more other access terminals in the primary sector prior to any timeslot available in the primary sector to carry data to the given access terminal;

in response at least to the first determination being negative, scheduling at least one timeslot of the upcoming timeslots for use to transmit data from the access network to the given access terminal in the primary sector;

in response to the first determination being positive, making a second determination at the access network of whether the threshold number of upcoming timeslots are scheduled for use to carry data to one or more other access terminals in the secondary sector prior to any timeslot available in the secondary sector to carry data to the given access terminal; and in response at least to the second determination being negative, scheduling at least one timeslot of the upcoming timeslots for use to transmit data from the access network to the given access terminal in the secondary sector.

10. The method of claim 9, further comprising:

in response to the second determination being positive, making a third determination at the access network of whether at least one timeslot is available for use in the tertiary sector to carry data to the given access terminal sooner than the any timeslot available in the secondary sector; and in response at least to the third determination being positive, scheduling the at least one timeslot for use to transmit data from the given access network to the access terminal in the tertiary sector.

11. The method of claim 10, wherein the data transmission request comprises an expanded Data Rate Control (DRC) request and further specifies a primary DRC code for the primary sector, a secondary DRC code for the secondary sector, and a tertiary DRC for the tertiary sector.

* * * * *